(12) United States Patent
Togare

(10) Patent No.: US 8,546,977 B2
(45) Date of Patent: Oct. 1, 2013

(54) VOLTAGE BASED SWITCHING OF A POWER SUPPLY SYSTEM CURRENT

(75) Inventor: Radhakrishna Togare, Vancouver, WA (US)

(73) Assignee: LSI Corporation, Milpitas, CA (US)

(*) Notice: Subject to any disclaimer, the term of this patent is extended or adjusted under 35 U.S.C. 154(b) by 47 days.

(21) Appl. No.: 12/427,771

(22) Filed: Apr. 22, 2009

(65) Prior Publication Data
US 2010/0270863 A1 Oct. 28, 2010

(51) Int. Cl.
*H02J 1/00* (2006.01)
*G05F 1/00* (2006.01)

(52) U.S. Cl.
USPC .............. 307/43; 307/44; 307/45; 307/64; 307/70; 307/85; 307/112; 307/125; 307/130

(58) Field of Classification Search
USPC ............ 307/11, 43–45, 64, 70, 85, 112, 125, 307/130
See application file for complete search history.

(56) References Cited

U.S. PATENT DOCUMENTS

| | | | | |
|---|---|---|---|---|
| 3,912,940 A * | 10/1975 | Vince | ............... | 307/64 |
| 4,272,650 A * | 6/1981 | Bolgiano et al. | ............. | 455/462 |
| 4,628,433 A * | 12/1986 | Notohamiprodjo | ............. | 363/65 |
| 4,788,450 A * | 11/1988 | Wagner | ............. | 307/64 |
| 4,860,188 A * | 8/1989 | Bailey et al. | ............. | 363/65 |
| 5,027,002 A * | 6/1991 | Thornton | ............. | 307/35 |
| 5,319,536 A * | 6/1994 | Malik | ............. | 363/65 |
| 5,583,753 A * | 12/1996 | Takayama | ............. | 363/71 |
| 5,635,773 A * | 6/1997 | Stuart | ............. | 307/66 |
| 5,654,859 A * | 8/1997 | Shi | ............. | 361/66 |
| 5,708,771 A * | 1/1998 | Brant et al. | ............. | 714/22 |
| 5,726,506 A * | 3/1998 | Wood | ............. | 307/147 |
| 5,739,596 A * | 4/1998 | Takizawa et al. | ............. | 307/66 |
| 5,784,626 A * | 7/1998 | Odaohara | ............. | 713/300 |
| 5,834,925 A * | 11/1998 | Chesavage | ............. | 323/272 |
| 5,894,413 A * | 4/1999 | Ferguson | ............. | 363/65 |
| 6,122,181 A * | 9/2000 | Oughton, Jr. | ............. | 363/37 |
| 6,253,330 B1 * | 6/2001 | Denkin et al. | ............. | 713/300 |
| 6,269,450 B1 * | 7/2001 | Iwata et al. | ............. | 713/340 |
| 6,278,624 B1 * | 8/2001 | Nelson | ............. | 363/65 |
| 6,333,570 B1 * | 12/2001 | Ilg | ............. | 307/75 |
| 6,420,906 B1 * | 7/2002 | Kohda | ............. | 326/114 |
| 6,456,508 B1 * | 9/2002 | Namai et al. | ............. | 363/17 |
| 6,462,926 B1 * | 10/2002 | Zaretsky et al. | ............. | 361/103 |
| 6,744,151 B2 * | 6/2004 | Jackson et al. | ............. | 307/43 |
| 6,800,962 B2 * | 10/2004 | Bahl et al. | ............. | 307/52 |
| 6,892,147 B2 * | 5/2005 | Bui et al. | ............. | 702/63 |
| 6,930,869 B1 * | 8/2005 | Zansky et al. | ............. | 361/84 |
| 6,958,552 B2 * | 10/2005 | Dodson, III | ............. | 307/52 |

(Continued)

FOREIGN PATENT DOCUMENTS

JP 2008077920 A * 4/2008

*Primary Examiner* — Adi Amrany
(74) *Attorney, Agent, or Firm* — Raj Abhyanker, P.C.

(57) ABSTRACT

Systems and methods of voltage based switching of a power supply system current are disclosed. In one embodiment, a power supply system includes a power bus to supply electrical power to a system load. A power supply is coupled to the power bus. The power supply provides current to the power bus and generates a voltage α. In addition, the system includes an additional power supply coupled to the power bus. The additional power supply generates a voltage β that is lower than the voltage α. An oring module restricts the additional power supply from providing current to the power bus, until a power bus voltage θ is greater than a threshold voltage.

14 Claims, 4 Drawing Sheets

VOLTAGE α 112 > VOLTAGE β 114
VOLTAGE β 114 < POWER BUS VOLTAGE θ 122

VOLTAGE α 112 < VOLTAGE β 114
VOLTAGE α 112 < POWER BUS VOLTAGE θ 122

(56) References Cited

U.S. PATENT DOCUMENTS

| | | | |
|---|---|---|---|
| 6,979,504 B2 * | 12/2005 | Manery | 429/432 |
| 6,987,333 B2 * | 1/2006 | Winick et al. | 307/85 |
| 7,205,681 B2 * | 4/2007 | Nguyen | 307/18 |
| 7,242,565 B2 * | 7/2007 | Yoshio | 361/103 |
| 7,256,515 B2 * | 8/2007 | Liang et al. | 307/43 |
| 7,336,053 B2 * | 2/2008 | Utsunomiya et al. | 320/103 |
| 7,355,829 B2 * | 4/2008 | Yamamura et al. | 361/91.1 |
| 7,379,282 B1 * | 5/2008 | Zansky | 361/82 |
| 7,466,573 B2 * | 12/2008 | Kojori et al. | 363/65 |
| 7,616,464 B2 * | 11/2009 | Phadke et al. | 363/79 |
| 7,671,489 B1 * | 3/2010 | Uy et al. | 307/86 |
| 7,698,595 B2 * | 4/2010 | Inoue et al. | 714/14 |
| 7,751,168 B2 * | 7/2010 | Itakura | 361/93.9 |
| 7,847,517 B2 * | 12/2010 | Guthrie et al. | 320/107 |
| 8,009,404 B2 * | 8/2011 | Blinder et al. | 361/160 |
| 2002/0057018 A1 * | 5/2002 | Branscomb et al. | 307/42 |
| 2003/0132669 A1 * | 7/2003 | Bahl et al. | 307/52 |
| 2004/0061474 A1 * | 4/2004 | Ozeki | 320/101 |
| 2004/0095021 A1 * | 5/2004 | Fogleman et al. | 307/52 |
| 2005/0068002 A1 * | 3/2005 | Ozeki | 320/101 |
| 2005/0220021 A1 * | 10/2005 | Sosnowski et al. | 370/235 |
| 2008/0164759 A1 * | 7/2008 | Sharma et al. | 307/52 |
| 2008/0266740 A1 * | 10/2008 | Smith | 361/91.5 |
| 2008/0316785 A1 * | 12/2008 | Usui | 363/126 |
| 2009/0085404 A1 * | 4/2009 | Suzuki et al. | 307/46 |
| 2009/0243390 A1 * | 10/2009 | Oto | 307/43 |
| 2009/0315395 A1 * | 12/2009 | Rogoll et al. | 307/23 |
| 2009/0322161 A1 * | 12/2009 | Patel | 307/131 |
| 2010/0265628 A1 * | 10/2010 | Blinder et al. | 361/160 |

* cited by examiner

| MODE 230 | VOLTAGE α 112 | VOLTAGE β 114 | POWER SUPPLY 100 PERCENTAGE LOAD 232 | ADDITIONAL POWER SUPPLY 104 PERCENTAGE LOAD 234 |
|---|---|---|---|---|
| A | 60V | 52V | 100% | 0% |
| B | 52V | 60V | 0% | 100% |
| C | 60V | 60V | 50% | 50% |
| D | 52V | 52V | 50% | 50% |

FIGURE 2

VOLTAGE BASED SWITCHING OF A POWER SUPPLY SYSTEM CURRENT

FIELD OF TECHNOLOGY

This disclosure relates generally to a power supply technology and in one example embodiment to voltage based switching of a power supply system current.

BACKGROUND

Multiple power supplies of a redundant power supply system may simultaneously provide power at substantially the same voltage. A load utilization of a power supply in the redundant power supply system may be lower than a rating of the power supply. Operating the power supply at the load utilization may be inefficient, which may result in an unnecessary power consumption. Furthermore, additional circuitry may be needed to control the voltages of each of the power supplies of the redundant power supply system. The additional circuitry may add an additional hardware cost. The additional circuitry may further include a potential cause of failure that may compromise the operation of the redundant power supply system.

SUMMARY

This summary is provided to comply with 37 C.F.R. 1.73, requiring a summary of the invention briefly indicating the nature and substance of the invention. It is submitted with the understanding that it will not be used to interpret or limit the scope or meaning of the claims.

Systems and methods of voltage based switching of a power supply system current are disclosed. In an exemplary embodiment, a power supply system includes a power bus to supply electrical power to a system load. The system includes a power supply coupled to the power bus. The power supply provides current to the power bus and generates a voltage $\alpha$. In addition, the system includes an additional power supply coupled to the power bus. The additional power supply generates a voltage $\beta$ that is lower than the voltage $\alpha$. The system also includes an oring module that restricts the additional power supply from providing current to the power bus until a power bus voltage $\theta$ is greater than a threshold voltage.

In an exemplary embodiment, a method of a power supply system includes providing current to a power bus and generating a voltage $\alpha$ using a power supply. The power supply is coupled to the power bus. In addition, the method includes maintaining a voltage $\beta$ of an additional power supply. The additional power supply is coupled to the power bus, and the voltage $\beta$ is lower than the voltage $\alpha$. The method further includes restricting the additional power system from providing current to the power bus using an oring module while a power bus voltage $\theta$ is greater than a threshold voltage.

In an exemplary embodiment, a power supply system includes a power bus to supply power to a system load. The system also includes a power supply that is coupled to the power bus. The power supply provides current to the power bus and generates an operating power that is within a threshold range of a power supply rating. The system includes an additional power supply coupled to the power bus. The additional power supply generates a voltage $\beta$ that is lower than the voltage $\alpha$. The voltage $\beta$ is within an additional threshold range of an additional power supply rating. The threshold range and the additional threshold range are each substantially between 75 percent and 125 percent. In addition, the system includes an oring module that restricts the additional power supply from providing current to the power bus while a power bus voltage $\theta$ is greater than a threshold voltage. The oring module allows the additional power supply to provide current to the power bus when the power bus voltage $\theta$ is lower than the voltage $\beta$. The additional power supply is activated while the oring module prevents it from providing current to the power bus.

The power supply system also includes an additional oring module that allows the power supply to provide current to the power bus while the voltage $\alpha$ is higher than the power bus voltage $\theta$. The oring module, the additional oring module, or both include an oring device. The oring module, the additional oring module, or both prevent current from being provided to the power bus when they are reverse biased and allow current to be provided to the power bus when they are forward biased.

The methods and system disclosed herein may be implemented in any means to achieve various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIG. 2 is a table view illustrating various modes with voltages and power supply percentage load, according to one embodiment.

Other features of the present embodiments will be apparent from the accompanying drawings and from the detailed description that follows.

DETAILED DESCRIPTION

Systems and methods of voltage based switching of a power supply system current are disclosed.

Figure 1A:
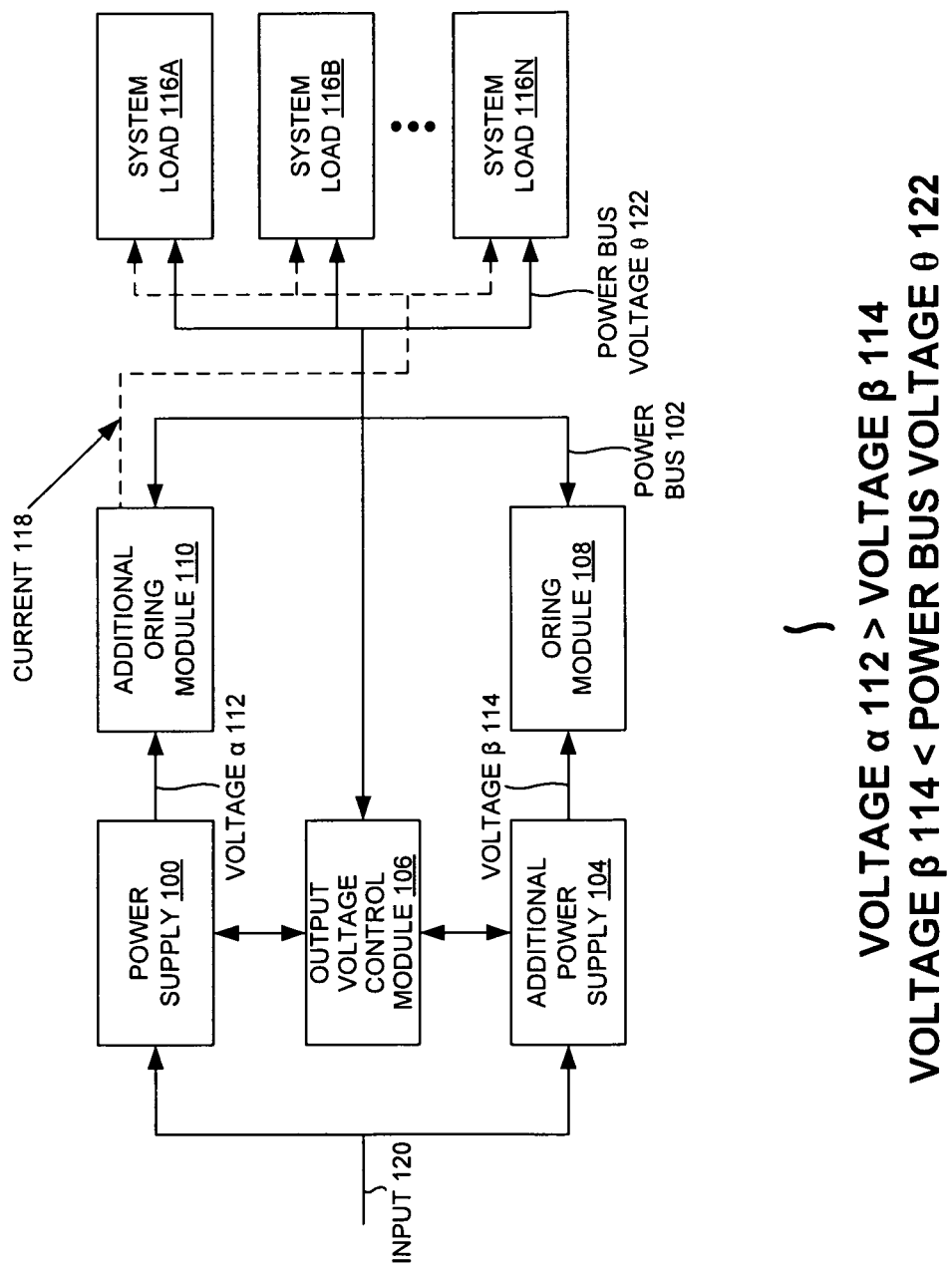
FIG. 1A is a system view illustrating a power supply system when voltage $\alpha$ is greater than voltage $\beta$, according to one embodiment.
Figure 1B:
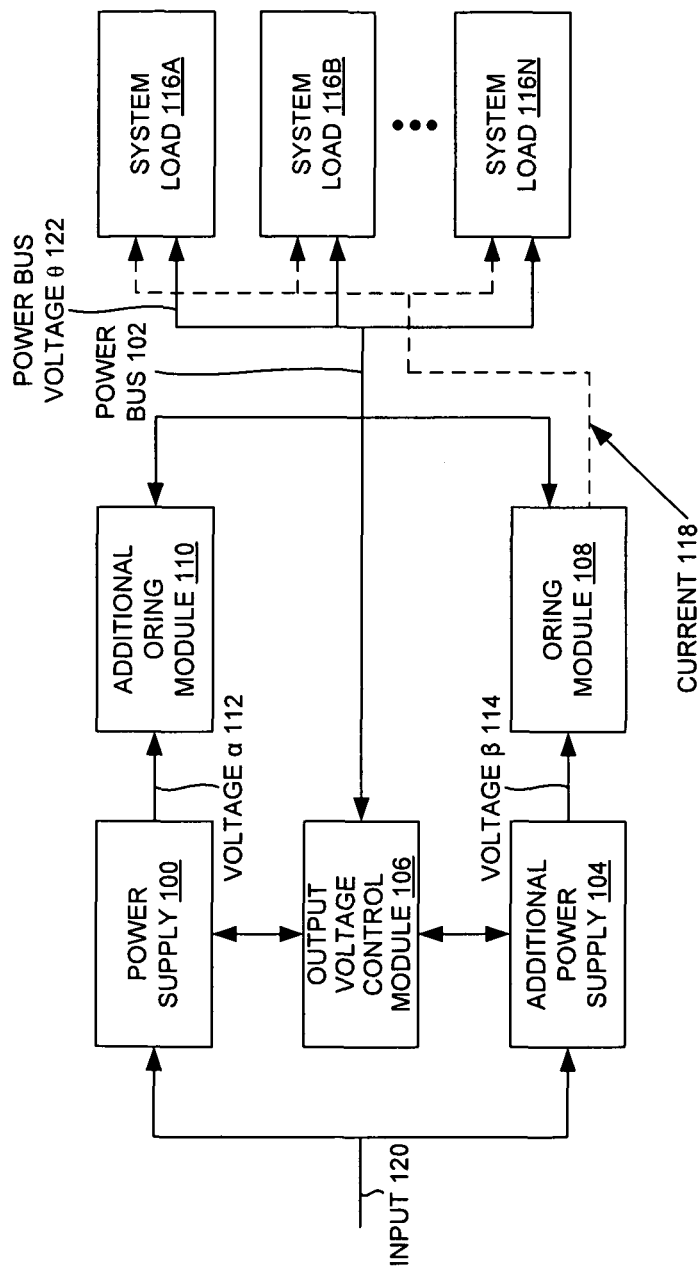
FIG. 1B is a system view illustrating a power supply system when voltage $\beta$ is greater than the voltage $\alpha$, according to one embodiment.

FIG. 1A and FIG. 1B are system views illustrating a power supply system. FIG. 1A is a system view illustrating a power supply system when voltage $\alpha$ 112 is greater than voltage $\beta$ 114, according to one embodiment. FIG. 1B is a system view illustrating a power supply system when voltage $\beta$ 114 is greater than voltage $\alpha$ 112, according to one embodiment. In particular, FIG. 1A and FIG. 1B illustrate a power supply 100, a power bus 102, an additional power supply 104, an output voltage control module 106, an oring module 108, an additional oring module 110, a voltage $\alpha$ 112, a voltage $\beta$ 114, a system load 116A-N, a current 118, an input 120, and a power bus voltage $\theta$ 122, according to one embodiment.

The power supply 100 and/or the additional power supply 104 may be switched mode power supplies. The power supply 100 and the additional power supply 104 may receive an input 120, which may indicate whether to provide power to the system load 116A-N. The power supply 100 may be coupled to system load 116A-N through the additional oring module 110 and/or the power bus 102. The additional power supply 104 may be coupled to the system load 116A-N through the oring module 108 and/or the power bus 102. The power bus 102 may supply electrical power to a system load 116A-N. The power supply 100 and the additional power supply 104 may be coupled to the system load 116A-N in parallel. The power supply 100 and the additional power supply 104 may be communicatively coupled to each other and/or to an output voltage control module 106. The output voltage control module 106 may be coupled to the power bus 102 and/or the system load 116A-N. The power supply 100 may provide current 118 to the power bus and generate a voltage $\alpha$ 112. The additional power supply 114 may generate a voltage $\beta$ 114.

The system load 116A-N may be any group of one or more devices that consume electrical power, such as servers, fans, lights, hard drives, RAID systems, volatile memory and/or nonvolatile memory. The system load 116A-N may be operated using power supplied from a power supply system that includes one or more power supplies.

In an embodiment, a power bus (e.g., the power bus 102) is used to provide electrical power to the system load 116A-N. In the embodiment, a power supply coupled to the power bus provides current 118 to the power bus and generates a voltage $\alpha$ 112. The additional power supply 104 is coupled to the power bus 102. The additional power supply 104 generates a voltage $\beta$ (e.g., the voltage $\beta$) that is lower than the voltage $\alpha$ 112. The voltage $\alpha$ 112 may be a voltage at which the system load 116A-N can function. The voltage $\alpha$ 112 may be reduced by the oring module 108. The voltage $\beta$ 114 may also be a voltage at which the system load 116A-N is operable. The power bus voltage $\theta$ 122 may be substantially equal to or lower than the voltage of a power supply that is providing power to the system load 116A-N.

In the embodiment, the oring module 108 restricts the additional power supply 104 from providing current 118 to the power bus while a power bus voltage $\theta$ 122 is greater than a threshold voltage (e.g., the voltage $\alpha$ 112). The power bus voltage $\theta$ 122 may be equal to or less than the voltage $\alpha$ 112, which may be generated by the power supply 100. The oring module 108 may be an oring device, which may be an oring diode, a schottkey diode, a silicon rectifier, a CMOS device. In an embodiment, when the oring module 108 is reverse biased, such as when the power bus voltage $\theta$ 122 is greater than the voltage $\beta$ 114, it may prevent the additional power bus supply from providing current 118 to the power bus. The additional power supply 104 may be activated (e.g., capable of providing power to the power bus 102 and/or the system load 116A-N) while the oring module 108 prevents it from providing current 118 to the power bus 102. In the embodiment, the oring module 108 may allow the additional power supply 104 to provide current 118 to the power bus 102 when the power bus voltage $\theta$ 122 is lower than the voltage $\beta$ 114. The voltage $\beta$ 114 may be generated by the additional power supply 104.

The operating power provided by the power supply may be within a threshold range of a power supply rating. The power supply rating may be a power level at which the power supply is designed to operate and/or may increase a performance aspect, which may include an efficiency, a time of operation, or a tolerance of power fluctuations. Furthermore, the additional operating power may be within an additional threshold range of an additional power supply 104 rating. The additional power supply 104 rating may be a power level at which the additional power supply 104 is capable of operating more efficiently, for a greater period of time, etc. The threshold range and/or the additional threshold range may be between 75% and 125%. For example, the operating power may be between 75% and 125% of the power supply rating, and the voltage $\beta$ 114 may be between 75% and 125% of the additional power supply 104 rating.

In an embodiment, the power supply system includes an additional oring module 110 that allows the power supply to provide current 118 to the power bus while the voltage $\alpha$ 112 is higher than the power bus voltage $\theta$ 122. The additional oring module 110 may be an oring device (e.g., a Schottkey diode, a CMOS device, etc.). The additional oring module 110 may allow the power supply 100 to provide current 118 to the system load 116A-N while the voltage $\alpha$ 112 is substantially equal to and/or greater than the power bus voltage $\theta$ 122. When the additional oring module 110 is reverse biased, it may prevent the power supply 100 from providing current 118 and/or power to the power bus 102. When it is forward biased, the additional oring module 110 may allow current 118 to be provided to the power bus 102.

An output voltage control module 106 may control an output voltage of either the power supply 100 or the additional power supply 104, or both. A separate output voltage control module 106 may be used for each of the power supplies in the power supply system. The output voltage control module 106 may switch the power supplies between a higher voltage and a lower voltage, and it may activate and/or turn off one or more of the power supplies. The output voltage control module 106 may move the power supply 100 or the additional power supply 104 between power modes, including the active mode, the watch mode, the sleep mode, and the off mode. These power modes are also described with respect to FIG. 2. The output voltage control module 106 may include hardware, such as a mechanical switch, an ASIC, an embedded processor, a personal computer, or a server. The output voltage control module 106 may include software that runs on a processor.

The output voltage control module 106 may raise an output voltage of the additional power supply 104 to a target output voltage. This may occur after the oring module 108 has allowed the additional power supply 104 to provide current 118 to the power bus 102 when the power bus voltage $\theta$ 122 has become lower than the additional operating voltage, which may be the voltage $\beta$ 114. The power bus voltage $\theta$ 122 may become lower than the voltage $\beta$ 114 because the power supply 100 has been turned off, because it has been shifted to a lower operating mode by the output voltage control module 106, and/or because a mechanical or software failure has occurred. The mechanical and/or software failure may include a component of the power supply 100, the output voltage control module 106, and/or any other software or hardware communicatively coupled to the power supply 100. The power bus voltage $\theta$ 122 may also become lower than the voltage $\beta$ 114 when the voltage $\beta$ 114 is increased, which may occur if the output voltage control module 106 raises the additional power supply 104 output voltage. The output voltage control module 106 may raise the output voltage of the additional power supply 104 to a target output voltage, which may be the prior power bus voltage $\theta$ that was supported by the power supply 100 using the voltage $\alpha$ 112.

During operation of the power supply system, in an embodiment, substantially all of a power bus load is carried by either the power supply 100 or the additional power supply 104. Which power supply provides power to the system load 116A-N may be automatically determined by the output voltage of the power supplies in the power supply system. One or more of the power supplies may be set to a higher voltage, which may allow them to provide power to the system load 116A-N. Power supplies in the power supply system that are set to a lower voltage may be restricted from providing power to the system load 116A-N by one or more oring modules. These may include the oring module 108 and the additional oring module 110.

In an embodiment, while a power bus load is carried by one or more power supplies of the power supply system, each power supply that is operated at a lower voltage may be protected from a power bus load while it is restricted from providing current 118 to the power bus 102. For instance, if the additional power supply 104 is operated at the voltage β 114 and the voltage β 114 is lower than the voltage α 112 and the power bus voltage θ, then the oring module 108 is reverse biased and the additional power supply 104 will be prevented from providing current 118 to the power bus 102. The additional power supply 104 may be put in a quiescent condition in which the additional power supply 104 is active but does not supply power to the system load 116A-N. When the output voltage of the power supply 100 is higher than the output voltage of the additional power supply 104, the power bus 102 may be powered by an ORed output of the power supply 100. The additional power supply 104 may also include the ORed output that is used to power the power bus 102 when the voltage β 114 is higher than the voltage α 112. The modes and the configuration of the output voltage control module 106 may be better understood from FIG. 2.

In an embodiment, if the power supply 100 that was supplying the power to the power bus 102 fails or reduces its output voltage with respect to the output voltage of the additional power supply 104, then the additional power supply 104 may automatically shift with a linear transition from a quiescent condition to an active mode to supply power to the power bus 102. The additional power supply 104 may provide a desired power to the system load 116A-N at the voltage β 114, which may be lower than the initial voltage of the power bus 102. The voltage level of the bus can be automatically or manually set to a higher output voltage level after the additional power supply 104 has been shifted to an active mode to supply power to the power bus 102.

FIG. 2 is a table view illustrating various modes with voltages and power supply percentage load, according to one embodiment. In particular, FIG. 2 illustrates a mode field 230, the voltage α 112 field, the voltage β 114 field, a power supply 100 percentage load field 232, and an additional power supply 104 percentage load 234 field, according to one embodiment.

The mode field 230 may illustrate modes for different configurations of the supply to the load. In an example embodiment, in Mode A, the voltage α 112 (e.g., 60V) may be higher than the voltage β 114 (e.g., 52V). The power supply 100 percentage to the system load 116A-N may be 100% and the additional power supply 104 percentage to the system load 116A-N may be 0% for Mode A.

In Mode B, the voltage α 112 may be lower than the voltage β 114. The voltage α 112 may be 52V and the voltage β 114 may be 60V. The output voltage control module 106 may enable the supply of power to the power bus 102 from the additional power supply 104 when the voltage β 114 is higher than the voltage α 112. In Mode B the percentage of power supplied by the additional power supply 104 to the system load 116A-N may be 100% and the percentage of power supplied to the system load 116A-N by the power supply 100 may be 0%.

In an embodiment, both the power supply 100 and the additional power supply 104 provide power to the system load 116A-N simultaneously, such as when the voltage α 112 and the voltage β 114 are substantially the same. For example, in Mode C, the voltage α 112 and the voltage β 114 are 60V. In Mode D, the voltage α 112 and the voltage β 114 are 52V. The voltage α 112 and the voltage β 114 may be the same when one of the voltages rises above or falls below the other voltage.

Figure 3:
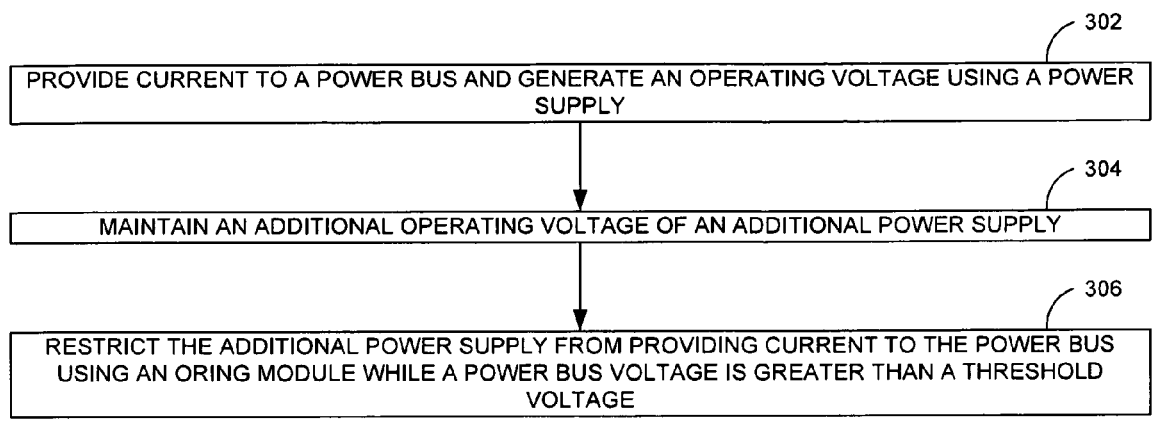
FIG. 3 is a process flow illustrating providing current to a power bus, according to one embodiment.

FIG. 3 is a process flow illustrating providing current to a power bus, according to one embodiment. In operation 302, the current 118 is provided to the power bus 102 and a voltage α (e.g., the voltage α 112) is generated using the power supply 100 (e.g., as illustrated in FIG. 1A). The power supply 100 may be coupled to the power bus 102. In operation 304, a voltage β (e.g., the voltage β 114) of the additional power supply 104 is maintained. The additional power supply 104 may be coupled to the power bus 102. The voltage β may be lower than the voltage α (e.g., as illustrated in FIG. 1 and Mode A in FIG. 2). In operation 306, the additional power supply 104 is restricted from providing current 118 to the power bus 102 using an oring module 108 while a power bus voltage θ 122 is greater than a threshold voltage.

Although the present embodiments have been described with reference to specific example embodiments, it will be evident that various modifications and changes may be made to these embodiments without departing from the broader spirit and scope of the various embodiments. For example, the various devices, modules, systems, etc. described herein may be enabled and operated using hardware circuitry, firmware, software or any combination of hardware, firmware, or software embodied in a machine readable medium. For example, the various electrical structures and methods may be embodied using transistors, logic gates, application specific integrated (ASIC) circuitry or Digital Signal Processor (DSP) circuitry.

Particularly, the power supply 100, the power bus 102, the additional power supply 104, the output voltage control module 106, the oring module 108, and the additional oring module 110 of FIGS. 1-3, and the other modules may be enabled using software and/or using transistors, logic gates, and electrical circuits (e.g., application specific integrated ASIC circuitry) such a power supply circuit, a power bus circuit, an additional power supply circuit, a voltage control circuit, an oring module circuit, and an additional oring module circuit and other circuit.

In addition, it will be appreciated that the various operations, processes, and methods disclosed herein may be embodied in a machine-readable medium or a machine accessible medium compatible with a data processing system, and may be performed in any order. Accordingly, the Specification and Drawings are to be regarded in an illustrative rather than a restrictive sense.

What is claimed is:

1. A power supply system comprising:
   a power bus to supply electrical power to a computing system load;
   a first power supply having a variable first output voltage and a second power supply having a variable second output voltage, wherein the first and second power supplies are coupled to the power bus in a parallel redundant configuration having an ORed output such that the first power supply is an active supply and the second power supply is a quiescent supply when the first output voltage is greater than the second output voltage, and such that the second power supply is the active supply and the first power supply is the quiescent supply when the second output voltage is greater than the first output voltage, wherein the active supply impresses current through the system load and the quiescent supply impresses essentially no current through the system load; and an output voltage control module that controls a magnitude of the first output voltage and a magnitude of the second output voltage such that the first output voltage is greater than the second output voltage at least once and the second output voltage is greater than the first output voltage at least once prior to a failure of one of the first and second power supplies.

2. The power supply system of claim 1, wherein at least one of the first power supply and the second power supply is a switched mode power supply.

3. The power supply system of claim 1, wherein an operating power provided by the first power supply is within a threshold range of a power supply rating thereof.

4. The power supply system of claim 3, wherein an operating power provided by the second power supply is within a corresponding additional threshold range of an additional power supply rating thereof.

5. The power supply system of claim 4, wherein the power supply rating and the additional power supply rating are associated with a power level at which at least one of a performance, an efficiency, a time of operation, and a tolerance of power fluctuation is optimized.

6. The power supply system of claim 1, wherein the quiescent supply linearly transitions to become the active supply upon the failure of the active supply.

7. The power supply system of claim 1, wherein the controls further include raising the output voltage of the active supply to a target output voltage.

8. A method of a power supply system comprising:
coupling a first power supply having a variable first output voltage with a second power supply having a variable second output voltage, wherein the coupling is in a parallel redundant configuration;
providing current to a power bus through an ORed output of the first and second power supplies such that the first power supply is an active supply and the second power supply is a quiescent supply when the first output voltage is greater than the second output voltage, and such that the second power supply is the active supply and the first power supply is the quiescent supply when the second output voltage is greater than the first output voltage, wherein the active supply impresses current through a system load and the quiescent supply impresses essentially no current through the system load; and
controlling, through an output voltage control module, a magnitude of the first output voltage and a magnitude of the second output voltage such that the first output voltage is greater than the second output voltage at least once and the second output voltage is greater than the first output voltage at least once prior to a failure of one of the first and second power supplies.

9. The method of the power supply system of claim 8, wherein at least one of the first power supply and the second power supply is a switched mode power supply.

10. The method of the power supply system of claim 8, wherein an operating power provided by the first power supply is within a threshold range of a power supply rating thereof.

11. The method of the power supply system of claim 10, wherein an operating power provided by the second power supply is within a corresponding additional threshold range of an additional power supply rating thereof.

12. The method of the power supply system of claim 11, wherein the power supply rating and the additional power supply rating are associated with a power level at which at least one of a performance, an efficiency, a time of operation, and a tolerance of power fluctuation is optimized.

13. A power supply system comprising:
a computing system load;
a power bus to supply power to the computing system load;
a first power supply having a variable first output voltage and a second power supply having a variable second output voltage, wherein the first and second power supplies are coupled to the power bus in a parallel redundant configuration having an ORed output such that the first power supply is an active supply and the second power supply is a quiescent supply when the first output voltage is greater than the second output voltage, and such that the second power supply is the active supply and the first power supply is the quiescent supply when the second output voltage is greater than the first output voltage, wherein the active supply impresses current through the system load and the quiescent supply impresses essentially no current through the system load; and
an output voltage control module that controls a magnitude of the first output voltage and a magnitude of the second output voltage such that the first output voltage is greater than the second output voltage at least once and the second output voltage is greater than the first output voltage at least once prior to a failure of one of the first and second power supplies.

14. The power supply system of claim 13, wherein the computing system load comprises at least one of a non-volatile memory, a volatile memory, a server, a hard drive and a RAID system.

* * * * *